March 17, 1942. R. I. HUFFMAN 2,276,725

HANDLE STRUCTURE

Filed Jan. 21, 1941

INVENTOR.
Russell I. Huffman,
BY Bair & Freeman
Attys.

Patented Mar. 17, 1942

2,276,725

UNITED STATES PATENT OFFICE 2,276,725

HANDLE STRUCTURE

Russell I. Huffman, Dover, Ohio, assignor to Knapp-Monarch Company, St. Louis, Mo., a corporation of Missouri Application January 21, 1941, Serial No. 375,312

4 Claims. (Cl. 38—90)

My present invention relates to a two piece handle structure adaptable for use on sadirons and the like.

One object of the invention is to provide a handle or hand grip for mounting on sadirons and the like, which is inexpensive to manufacture and which may be readily assembled by mounting the two parts of the handle on handle supports and projecting a through bolt through the supports and handle, the through bolt, when a nut is positioned thereon, serving to hold the two parts of the handle assembled and to connect the handle with the handle supports.

Another object is to provide a handle which may be molded of Bakelite or similar insulating material, the handle being formed in two parts so that it may be made hollow, and the two parts having overlapping perforated ears to coact with the through bolt to thereby hold the two parts of the handle assembled with relation to each other.

Another object is to provide a handle of two piece, hollow construction having vent openings communicating the interior thereof with external atmosphere to keep the handle relatively cool.

Still a further object is to provide the two parts of the handle with rabbeted joints between their meeting edges, so that the two parts interlock with each other when the through bolt is in position.

With these and other objects in view, my invention consists in the construction, arrangement and combination of the various parts of my device whereby the objects contemplated are attained, as hereinafter more fully set forth, pointed out in my claims and illustrated in the accompanying drawing. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawing, in which:

Figure 1:
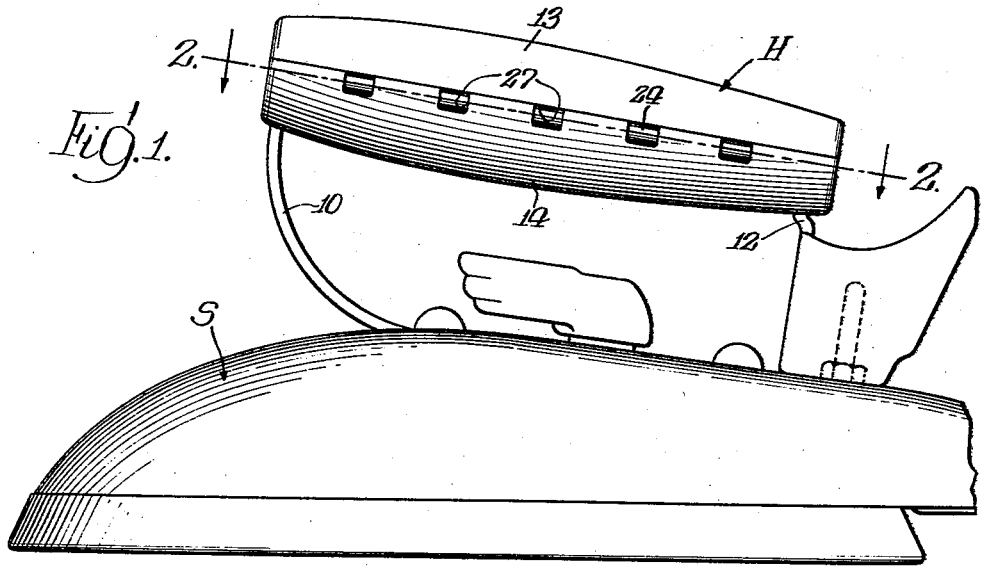
Figure 1 is a side elevation of a sadiron showing my handle structure mounted thereon.
Figure 2:
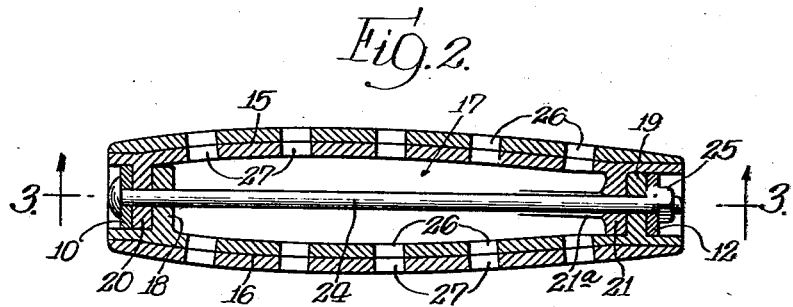
Figure 2 is a horizontal sectional view on the line 2—2 of Figure 1.

On the accompanying drawing, I have used the reference character S to indicate generally a sadiron. Handle supports 10 and 12 of strap iron formation extend upwardly therefrom. My handle, indicated generally at H, is mounted on the upper ends of the handle supports 10 and 12.

Figure 4:
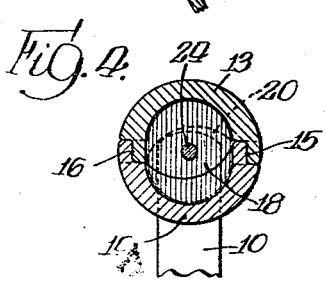
Figure 4 is a vertical sectional view on the line 4—4 of Figure 3.
Figure 5:
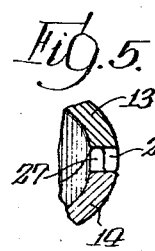
Figure 5 is a vertical sectional view on the line 5—5 of Figure 3 to show vent openings provided in the handle structure.

My handle H comprises an upper handle member 13 and a lower handle member 14. The handle members 13 and 14 divide the handle H longitudinally into two parts and there are two joints between them at the right and left sides of the handle. These joints are of rabbeted character, as shown in Figure 4, and indicated at 15 and 16 respectively.

The handle members 13 and 14 when assembled provide a hollow handle structure wherein the hollow space is indicated at 17. Adjacent but spaced inwardly from the ends of the handle members 13 and 14 are perforated ears. The front ear of the upper handle member 13 is indicated at 18 and its rear ear at 19. The front ear of the lower handle member 14 is indicated at 20 and its rear ear at 21. The ears are spaced far enough inwardly that they provide countersunk spaces 22 at the front end and 23 at the rear of the handle H. The spaces 22 and 23 receive the handle supporting straps 10 and 12, respectively, so that they are countersunk with relation to the ears of the handle.

Figure 3:
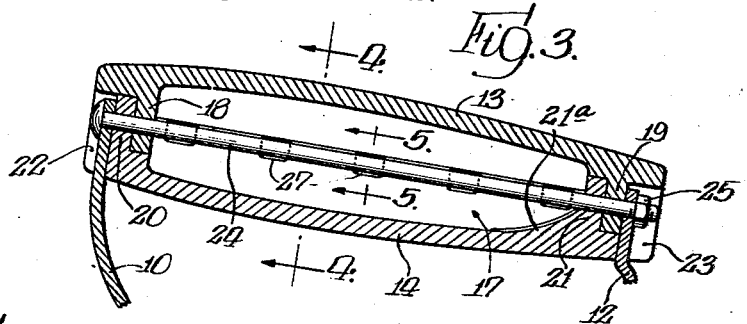
Figure 3 is a vertical sectional view on the line 3—3 of Figure 2.

The handle members 13 and 14 are assembled by overlapping the ears 18 and 20 and the ears 19 and 21, as shown in Figure 3, with the perforations thereof in alignment. The handle is then placed between the handle supports 10 and 12 and a through bolt 24 is extended through perforations adjacent the upper ends of the handle supports and through the perforated ears. A grooved guide rib 21a aids in properly locating the bolt 24 with respect to the ear 21. A nut 25 is then screwed onto the through bolt and the through bolt then accomplishes the double result of mounting the handle on the handle supports and holding the handle members assembled with relation to each other.

If desired, the overlapping elements of the joints 15 and 16 may be provided with notches 26 in the upper handle member 13, and 27 in the lower handle member 14. The notches 26 and 27 register with each other to provide vent openings from the exterior to the interior of the handle. The vent openings permit air circulation which keeps the handle relatively cool.

My handle structure makes it possible to provide a molded handle of hollow character by forming the handle in two parts and the particular construction of the parts is such that means other than the through bolt 24 is unnecessary to keep the parts in assembled relation. Thus the through bolt accomplishes the double purpose of keeping the handle parts assembled and mounting them on the handle supports.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a handle structure, an upper handle member and a lower handle member, each of said handle members being hollow and having rabbeted joints at their meeting edges, the ends of said handle members being arranged in overlapping engagement and being perforated, handle supports against the outer faces of said overlapped ends and countersunk with relation to the terminal ends of said handle members, and a through bolt through said handle supports and through the perforations of said overlapped ends of said handle members, said handle members being provided with vent openings in the sides thereof and extending through said rabbeted joints.

2. A handle structure comprising upper and lower handle members, each having rabbeted joint connection with the other, the ends of said handle members having ears arranged in overlapping engagement, handle supports for said handle members, and a through bolt through said handle supports and through said ears.

3. A handle structure comprising a tubular handle including two handle members each constituting one-half of the tubular handle, said handle members having rabbeted joint connections at their meeting edges, each of said handle members having perforated ears adjacent its ends, said ears overlapping each other with their perforations in alignment, handle supports at the ends of said handle and a through bolt through said handle supports and through said ears to retain said handle on said supports and the handle members thereof in assembled relation to each other, said handle members being provided with vent openings extending through said rabbeted joint connections.

4. In a handle structure, a tubular handle comprising two handle members each constituting one-half of the handle, each of said handle members having perforated ears adjacent its ends, the ears of one handle member overlapping and in engagement with the ears of the other handle member with their perforations in alignment, handle supports against the outer faces of the outer ears, and a through bolt through said handle supports and ears to retain said handle on said supports and the handle members thereof in assembled relation to each other.

RUSSELL I. HUFFMAN.